(12) United States Patent
Sethi et al.

(10) Patent No.: US 11,490,239 B2
(45) Date of Patent: Nov. 1, 2022

(54) EMERGENCY REPORTING APPLICATION

(71) Applicants: Manmeetsingh Sethi, Nagpur (IN); Keyan Zandy, Richardson, TX (US)

(72) Inventors: Manmeetsingh Sethi, Nagpur (IN); Keyan Zandy, Richardson, TX (US)

(*) Notice: Subject to any disclaimer, the term of this patent is extended or adjusted under 35 U.S.C. 154(b) by 36 days.

(21) Appl. No.: 17/130,441

(22) Filed: Dec. 22, 2020

(65) Prior Publication Data

US 2021/0112395 A1    Apr. 15, 2021

Related U.S. Application Data

(62) Division of application No. 16/009,544, filed on Jun. 15, 2018, now Pat. No. 10,904,735.

(51) Int. Cl.
| | | |
|---|---|---|
| *H04W 4/90* | (2018.01) | |
| *G08B 27/00* | (2006.01) | |
| *H04W 4/029* | (2018.01) | |
| *H04B 7/0413* | (2017.01) | |
| *H04B 7/0417* | (2017.01) | |
| *H04B 7/0426* | (2017.01) | |
| *B64C 39/02* | (2006.01) | |

(52) U.S. Cl.
CPC ............ *H04W 4/90* (2018.02); *G08B 27/001* (2013.01); *H04B 7/0413* (2013.01); *H04B 7/0417* (2013.01); *H04B 7/0426* (2013.01); *H04W 4/029* (2018.02); *B64C 39/024* (2013.01)

(58) Field of Classification Search
CPC ....... H04W 4/90; H04W 4/029; H04W 76/50; G08B 27/001; G08B 27/005; G08B 25/014; G08B 25/10; G08B 25/016; G08B 17/10; G08B 21/0446; G08B 7/066; H04B 7/0413; H04B 7/0417; H04B 7/0426; B64C 39/024; H04M 2250/10; H04L 12/1895
See application file for complete search history.

(56) References Cited

U.S. PATENT DOCUMENTS

| | | | |
|---|---|---|---|
| 2006/0015254 A1 | 1/2006 | Smith | |
| 2007/0072583 A1* | 3/2007 | Barbeau | H04M 3/487 455/404.2 |
| 2011/0037590 A1 | 2/2011 | Kannan | |
| 2012/0028600 A1* | 2/2012 | Vallaire | G08B 27/008 455/404.2 |
| 2014/0201072 A1* | 7/2014 | Reeser | G06Q 30/04 705/40 |

(Continued)

*Primary Examiner* — Fred A Casca
(74) *Attorney, Agent, or Firm* — Kirby Drake

(57) ABSTRACT

A wireless communication-based casualty reporting, responder-ready emergency application system permits users to notify one or more pre-programmed responders of an emergency event so that an emergency alert can be broadcast to notify the users in the facility/site of the emergency. The system includes a check-in and verification component to provide access with respect to each specific facility/site. The system further includes a data storage provision coupled with the main application and is configured to maintain logs of alert events and other relevant information for future reference to build protocols and check for any patterns. To facilitate these operations, the system is programmed to relay crisis management plans and standard emergency protocols to users within a facility/site when an emergency event arises.

5 Claims, 10 Drawing Sheets

(56) References Cited

U.S. PATENT DOCUMENTS

2016/0042637 A1\* 2/2016 Cahill ................... G16H 40/67
 701/3
2016/0225243 A1\* 8/2016 Albass .................. G08B 25/10
2017/0134923 A1 5/2017 Kuznetsov
2018/0053394 A1\* 2/2018 Gersten ................. G08B 21/10
2018/0235015 A1\* 8/2018 Musgrove .............. H04W 4/90

\* cited by examiner

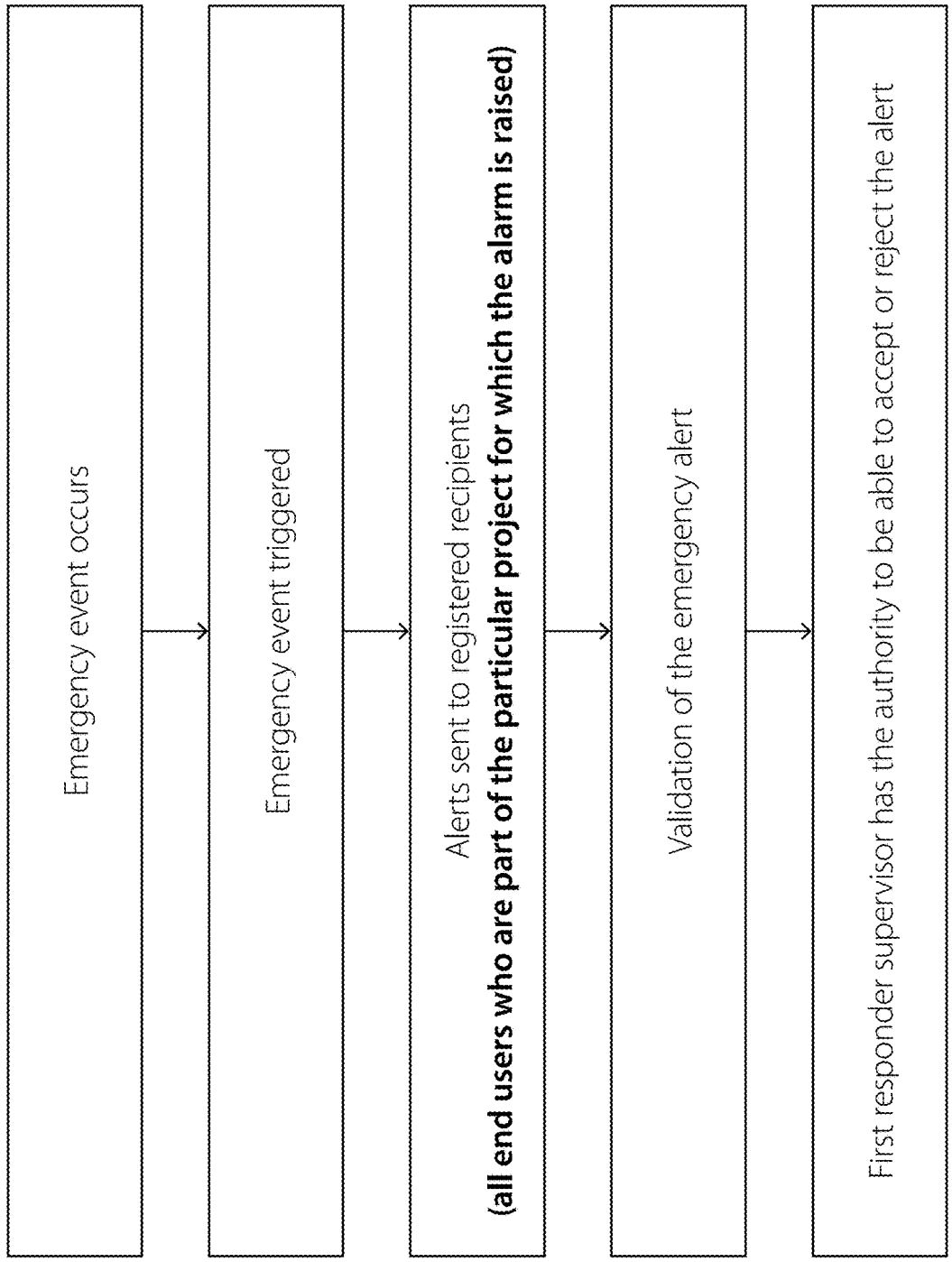

EMERGENCY REPORTING APPLICATION

CROSS REFERENCE TO RELATED APPLICATION

This application claims the benefit under 35 U. S.C. § 119(e) of U.S. patent application Ser. No. 16/009,544 filed on Jun. 15, 2018, entitled "Emergency Reporting Application," which is incorporated by reference in its entirety.

FIELD OF THE DISCLOSURE

The present disclosure generally relates to an application that provides for communication of emergency alerts between and among users' portable handheld devices of the users as well as building alarm systems, residential alarm system, annunciator devices, and other alarm devices located inside or outside a business or residence.

BACKGROUND

In general, facilities/sites can be confusing to navigate for persons unfamiliar with the premises, especially in terms of egress points and providing a location to meet in case of an emergency. Different facilities/sites may have identical looking layouts and/or the facilities have complex layouts. Facilities/sites may have chaotic conditions, such as ongoing construction, heavy machinery operations, repair, emergencies and maintenance work. Such conditions may render regions of the facility/site temporarily inaccessible or hazardous to be used. When an emergency event occurs, these conditions can prove to be challenging for persons at a facility/site and can complicate the process of rapid evacuation.

Facilities/sites often provide one or more evacuation maps depicting the current location of the person and the nearest egress points. However, during an emergency event, commotion may render these maps useless. Conventional alert methods involve manual tracking and verbal communication of warning which can prove to be inefficient and inaccurate. Also, it can sometimes be difficult for persons to judge the credibility of an alert (i.e., whether it is verified or may even be a hoax). In such instances, persons may not have enough credible information to take appropriate response measures.

SUMMARY

Embodiments of the present disclosure may provide an emergency reporting application comprising: a control system configured to communicate with one or more handheld mobile devices over a wireless communication interface to provide real-time updating and assessment of an emergency event occurring at a specified facility or site, the control system may comprise an emergency responder reporting component, a map updater, a device position determiner, an emergency trigger, and a real-time update generator; and at least one database coupled to the control system, wherein the at least one database may store real-time maps and locations of the specified facility or site, evacuation plans and maps of the specified facility or site, and crisis management plans for retrieval by the control system upon occurrence of the emergency event, wherein users that may be associated with the one or more handheld mobile devices may check into the emergency reporting application and once confirmed to be associated with the specified facility or site, the users may report the emergency event, and users logged into the emergency application and confirmed to be associated with the specified facility or site may receive an alert about the emergency event through the emergency reporting application. The users may check into the emergency reporting application using a unique quick response (QR) code or personal identification number (PIN). When the users report the emergency event, the users may provide documentary proof of the emergency event or the system can confirm the event is associated with an electronic boundary of the location, building, or event. A crisis management plan associated with the specified facility or site may be displayed or provided upon activation of the alert about the emergency event. The control system may provide real-time updates to the users for the specified facility or site while the alert is activated. The specified facility or site may include the facility or site and area within a predefined vicinity of the facility or site. In one alternative embodiment, the area can be drawn by a user or created in real time. The emergency reporting application also may include a location determining agent associated with the specified facility or site that discloses the locations of the one or more handheld mobile devices of the users to the one or more emergency responders in real-time after the alert is activated. The control system may activate a sound alert at the specified facility or site when the alert is activated.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which:

FIG. 4 is a flowchart of communication events which may occur in accordance with embodiments of the present disclosure;

DETAILED DESCRIPTION

Embodiments of the present disclosure may provide a mobile application that facilitates communication between and among users and makes users aware of emergency situations and how to evacuate or seek help in a given facility/site during an emergency situation. In an emergency situation, the mobile application may guide users to one or more evacuation routes and/or primary assembly areas associated with the facility/site. The mobile application also may share share emergency contacts and centers of project jobsite. Embodiments of the present disclosure also may provide easy accessibility for evacuation route maps, emergency services, an/or contacts.

Figure 1:
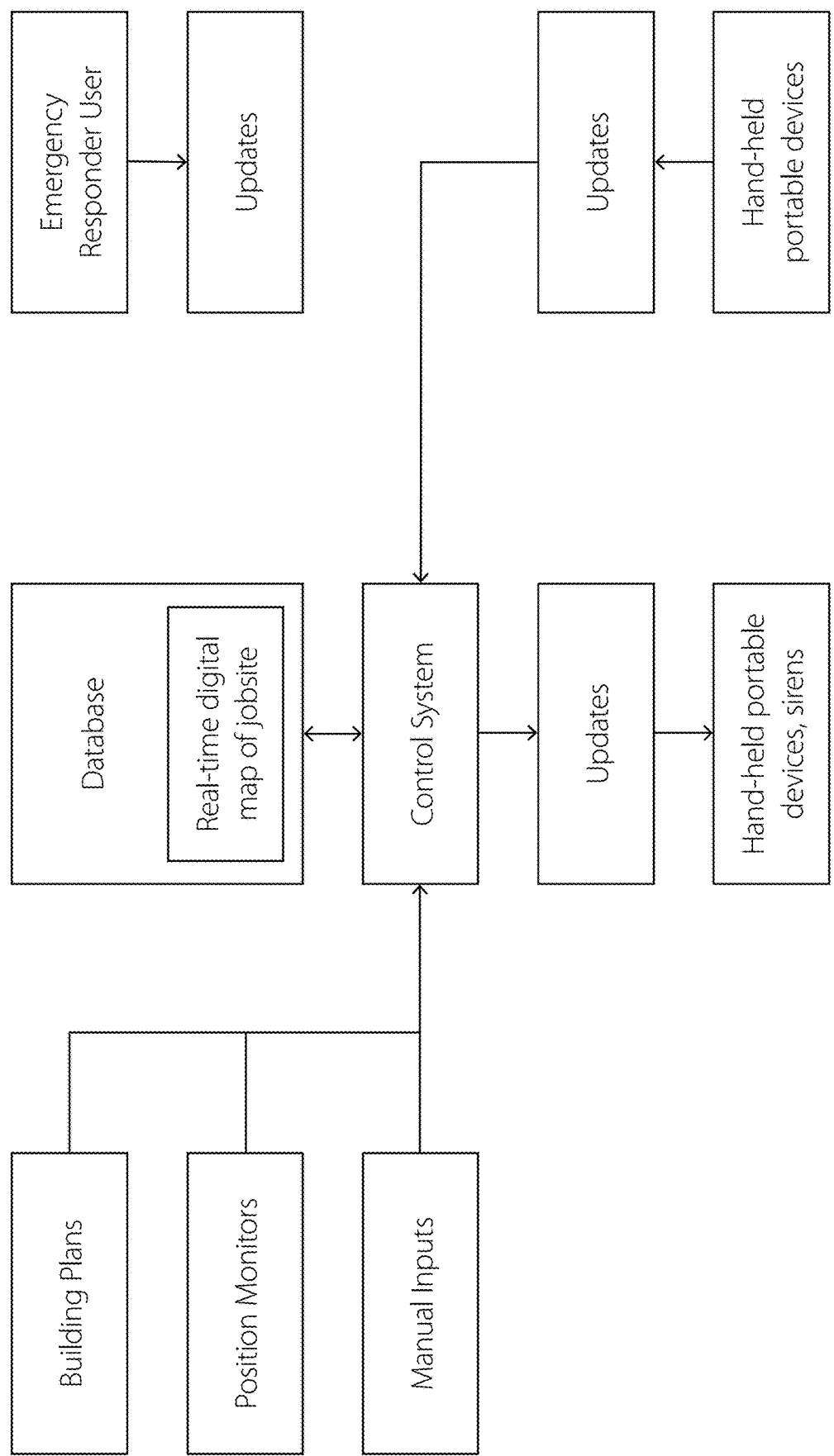
FIG. 1 depicts an emergency responding platform in accordance with embodiments of the present disclosure.

FIG. 1 depicts an emergency responding platform in accordance with embodiments of the present disclosure. As depicted in FIG. 1, information including, but not limited to, building plans, position monitors and/or manual inputs may be fed into a control system that communicates with at least one database that may include a real-time digital map of the facility/site. In one embodiment, the map may be a three-dimensional map of the facility or may be operable to update as a person moves through the building or facility. One or more emergency responder users may provide updates to the control system. Similarly, one or more handheld portable devices associated with one or more users may provide updates to the control system. The control system may then distribute updates from the one or more emergency responder users and/or one or more handheld portable devices to one or more handheld portable devices. The control system also may activate sirens or other alerts in embodiments of the present disclosure.

Figure 2:
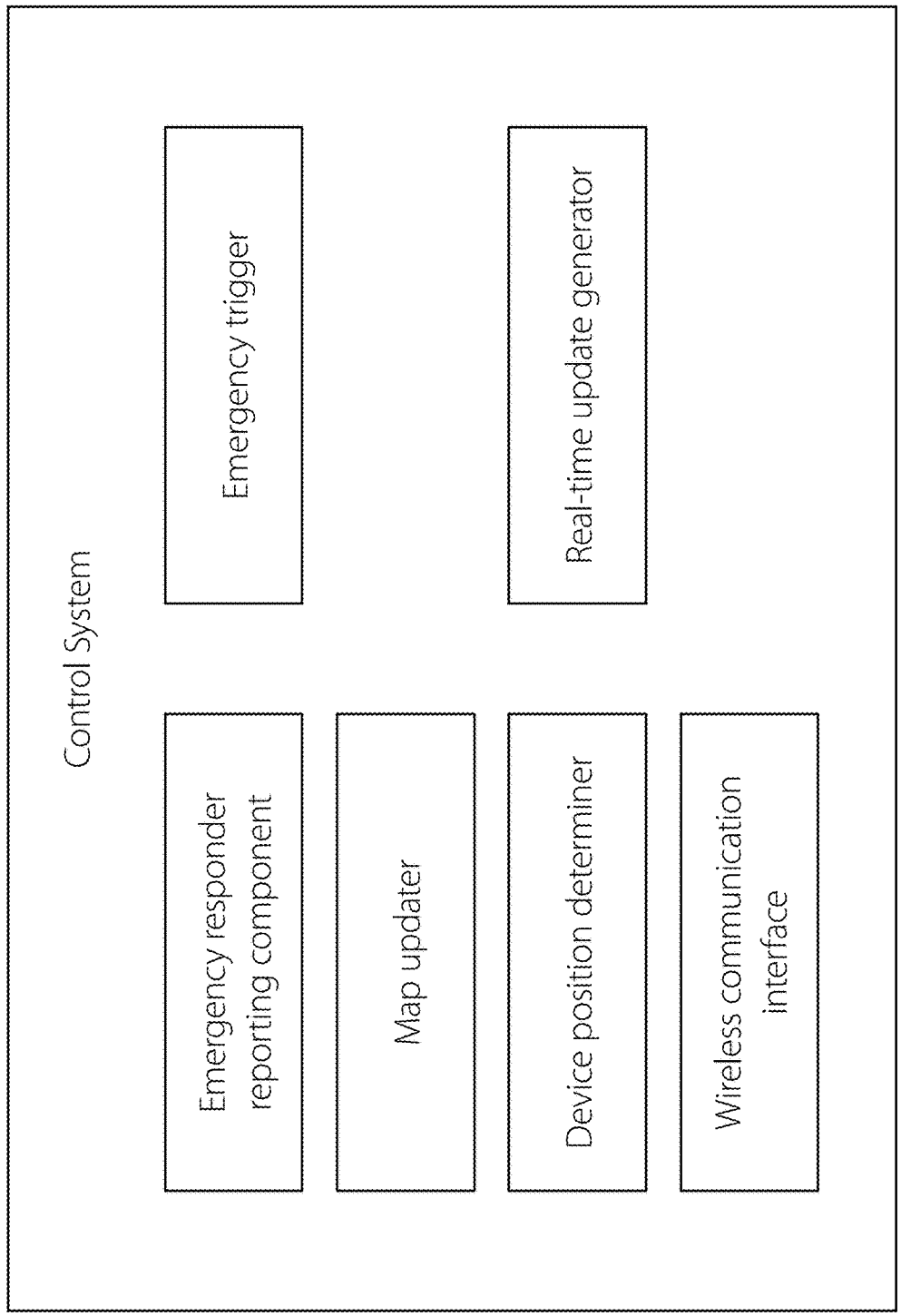
FIG. 2 depicts a diagram of components of a control system that may be used in accordance with embodiments of the present disclosure.

FIG. 2 depicts a control system that may be used in accordance with embodiments of the present disclosure. As depicted herein, the control system may be a computer/application system that may include one or more components including, but not limited to, an emergency responder reporting component, a map updater, a device position determiner, a wireless communication interface, an emergency trigger, and/or a real-time update generator.

It should be appreciated that the application may be available on both Android and iOS platforms, as well as other mobile device platforms that may later become available including in native, non-native, and/or cloud-based formats, in embodiments of the present disclosure. The application may be made available for use by end users who are in the specified vicinity of a facility/site, registered with the application, and have checked-in using a QR code or PIN as described in more detail herein.

Users may download the application and may be prompted to provide one or more items of information including, but not limited to, cell phone number, name, personal identification number (PIN), and/or email address. It should be appreciated that certain items of information may be mandatory for a user to provide to access the application; however, there may be other items of information that may be optional. It also may be appreciated that the application may provide more than one language option so that a user may select which language to use within the application and in one embodiment, the application can change the language based upon voice and/or language recognition. In some embodiments of the present disclosure, a one-time PIN or password may be sent to the user to complete the sign-up process. In another embodiment, the user can register with the application using a retinal scan, thumbprint, voice recognition, and/or fingerprint. The one-time PIN or password may be input manually or the application may read the PIN/password itself to allow the user to proceed. While PINs or passwords are described herein, it should be appreciated that other mechanism may be used to complete the sign-up process without departing from the present disclosure. In other embodiments of the present disclosure, the user may complete the setup using a call facility. It should be appreciated that sign-up may be based on the country location of the portable device being used to initiate sign-up in embodiments of the present disclosure. Using the country location, the user's cell phone number may be prefixed with the country code.

Figure 12:
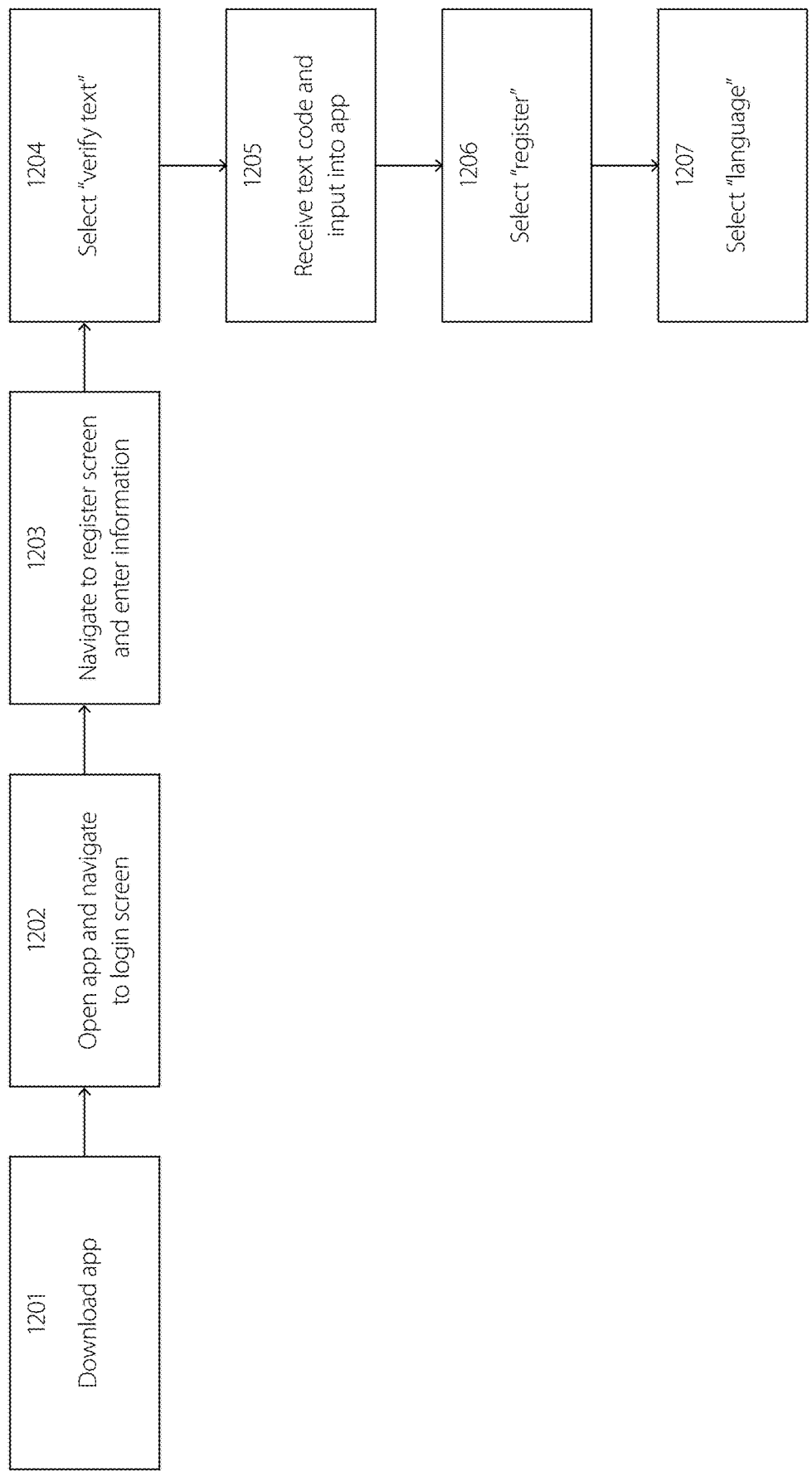
FIG. 12 depicts an initial registration process according to an embodiment of the present disclosure.

FIG. 12 depicts an initial registration process according to an embodiment of the present disclosure. In step 1201, a user may download the application from one or more application stores. In step 1202, the user may open the downloaded application and navigate to a login screen. It should be appreciated that there may be embodiments of the present disclosure where a user may be prompted for some permissions upon opening the application. It also may be appreciated that the user may be presented with one or more splash screens that contain information about the application and/or how to get started in embodiments of the present disclosure. The user may select, for example, a "get started," icon to navigate to a login screen in some embodiments of the present disclosure. On the login screen, the user may be presented with one or more fields including, but not limited to, mobile number, country code, first name, and last name. In step 1203, the user may enter information in these one or more fields, and in step 1204, the user may select "verify text" on the login screen. Upon selecting this button or icon, a request may be sent to one or more servers, and in step 1205, the user may receive a text code for mobile number verification. The user may enter the text code and then select the "register" button or icon in step 1206. In step 1207, the user may be prompted to select a language for use within the application. It should be appreciated that the default language may be presented as English and one or more additional language options may be provided. When a user selects a language, he/she will see the entire application in that language unless a new language is later selected.

Once a user has registered with the application, the user may be automatically logged into the application using his/her cell phone number. This may provide a check to ensure that the user is properly authenticated. If there has been a change in subscriber identity module (SIM) when the user attempts to access the application, the user may be prompted to re-login. Moreover, in case of inactivity over a specified period of time, the user may be prompted to check in again.

Once the user has logged in, the user may be prompted to check into a specific project using a QR code, thumbprint, retinal scan, voice confirmation, or PIN to be able to view details associated with the project and/or the facility/site and receive emergency alerts. Once checked-in, the user may remain checked in that project until the user is no longer present in the vicinity of the facility/site as set within the application, via exiting a geofence, or as a user that may only receive alerts within the application when he/she is in within the specified vicinity of the facility/site.

Figure 13:
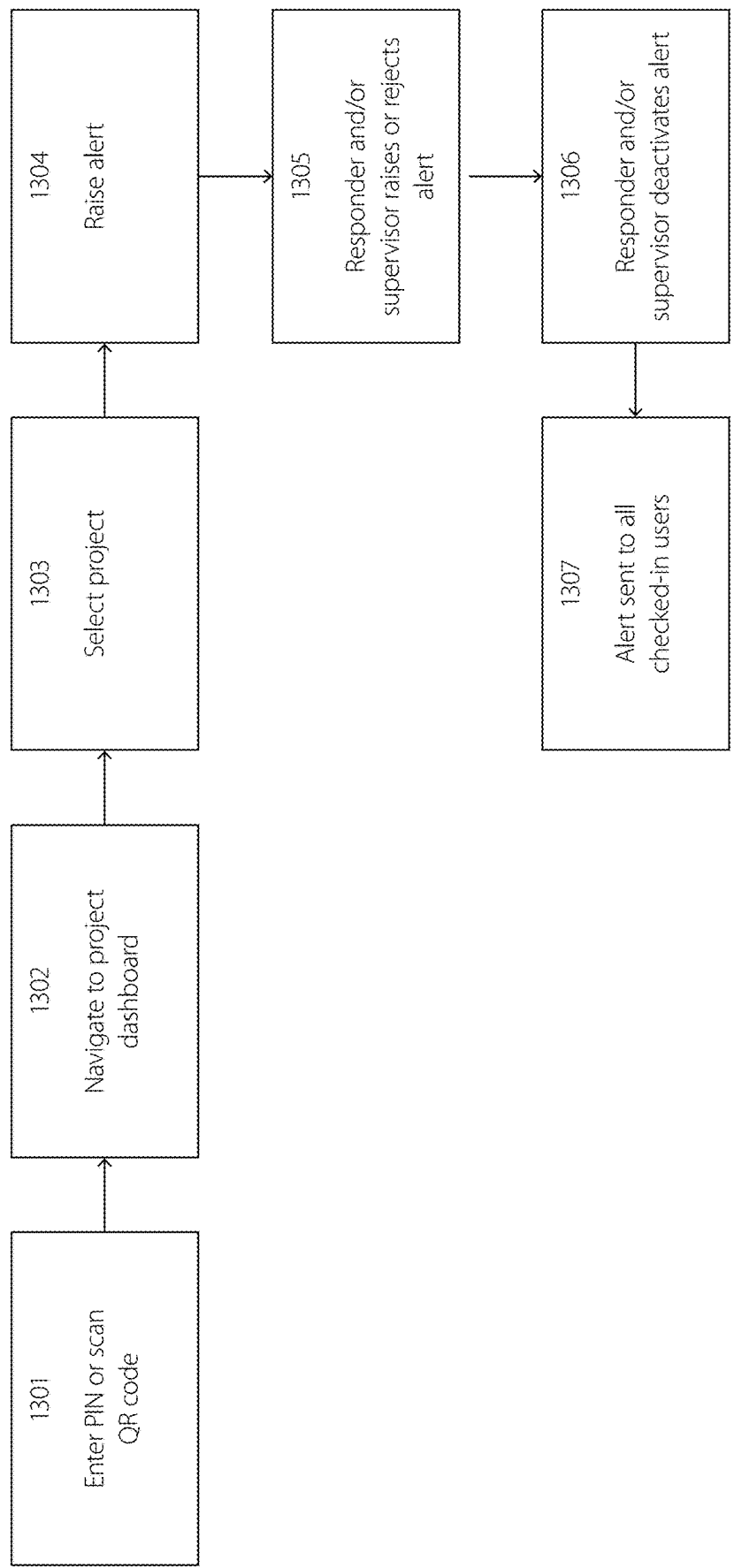
FIG. 13 depicts a check-in, project access, and alert process according to an embodiment of the present disclosure.

FIG. 13 depicts a check-in, project access, and alert process according to an embodiment of the present disclosure. This process may be followed after a user has been registered within the application. If the user is already registered within the application, the user may be prompted to enter his/her mobile number and country code on the login screen. In step 1301, the user may check into a project using a project PIN and/or by scanning a QR code associated with the project. After check-in, the user may navigate to the project dashboard where the user may view the check-in project (step 1302). If the user has previously checked into a project, the user may view all check-in projects on the dashboard. If the user is a responder, he/she may see all projects where he/she also acts as an emergency contact for accepting or declining alerts.

The application also may include emergency persons or supervisors that are users designated at each site to handle emergencies and raise alarms. These users may include site supervisors, managements, and/or other persons who are privy to the operations of the facility/site and can maneuver in and around the premises. The application may enable these supervisors to initiate necessary measures to address an emergency alert in real-time with the aid of digital crisis management plans and broadcasting features as described herein. Initiation of certain measures may be started by selecting an icon on the application, voice command, voice authentication, interrogating certain emergency services, contacting certain police, fire, and/or other law enforcement in the area. It should be appreciated that a separate log-in or second measure of authentication may be provided for emergency supervisors. This log-in process and/or system verification may be the same for supervisors as that described with respect to end users. Once the emergency supervisor has logged in, the emergency supervisor may be directly checked into a specific project. Certain projects may be earmarked for a supervisor to receive alerts raised by checked-in end users. These projects may be depicted with a supervisor icon and/or may be depicted with a specific color or other designation. It should be appreciated that these earmarked projects may enable the supervisor to receive alerts regardless whether he/she is physically located on the premises at the time that the alert is raised. In some embodiments of the present disclosure, an emergency supervisor may also be able to view photos and/or video associated with an alarm. The emergency supervisor is tasked with verifying the credibility of the information provided regarding an emergency event and may normalize/close the emergency alarm once the situation is under control. It should be appreciated that an alert may remain in activated mode until the supervisor, emergency services, administrator, or network deactivates it. In activated mode, the end users may see the project with the alert in their respective project lists, and they can view the details of the alert by selecting the project. The emergency supervisor may be prompted to deactivate the protocol and add comments, if any, about the alarm. Upon confirmation, the alarm may be deactivated, and end users may be notified. It should be appreciated that emergency supervisors may be able to handle multiple sites.

It should be appreciated that all users of the application may be permitted to view projects in list view if the users are within a specified vicinity of the project. To access a particular project, a user may scan a QR code, enter a PIN relevant to the project, or otherwise register with the project. Once the QR code, PIN is entered, or other registration is accomplished, the user may be checked into the project, and the user may view project-related safety details including the crisis management plan (CMP), emergency centers, emergency contacts, and emergency protocols. The project check-in feature may allow restriction of access certain projects. In case he/she wants to make project public, a QR code/PIN may be displayed at prominent locations. Otherwise it may be limited to specified users. Checked-in or registered users may raise an alert for emergency conditions at the project site. To raise an alert, the user may click on an alert icon. The user may then be directed to a camera component so that he/she may capture images and/or video about the emergency situation. The images and/or video may be saved or archived, and the user may share it with the emergency contacts and supervisor(s) associated with the specific project site. The emergency supervisor may assess the alert and then either raise the alarm or decline the alarm. If the alarm is approved, the users in the project site vicinity having checked-in status may receive a warning message as will be described in more detail herein.

In embodiments of the present disclosure, a splash screen may be provided within the application that provides one or more items of information to a user. For example, a first screen may depict an emergency alert where an end user may notify a supervisor of the emergency situation. A second screen may depict a responder who will analyze the emergency situation and take proper action. A third screen may depict an emergency protocol to be followed to access security services. While three screens may be utilized before a user gets started within the application, it may be appreciated that more or fewer than three screens may be utilized and/or the presentation of the information to a user may change without departing from the present disclosure.

Figure 5:
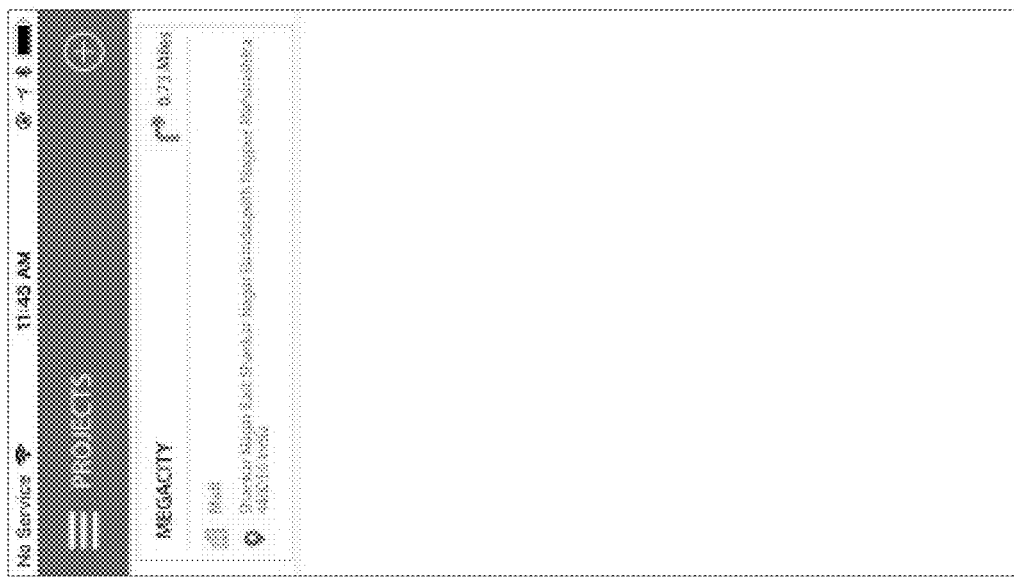
FIG. 5 depicts a project list within an emergency responding platform in accordance with embodiments of the present disclosure.

Projects and/or sites may be depicted within the application based on the role that has been assigned to the user. For example, an end user may see projects where he/she has checked in. An emergency contact supervisor may see projects where the user is a supervisor as well as projects where he/she is checked in. It should be appreciated that projects where the user is a supervisor may be designated, for example, using a different colored text. When a project list view is utilized, the list may include, but is not limited to, the project name, the building type, the address, the distance, and/or a map view as depicted in FIG. 5. As depicted in FIG. 5, the project list may include a plus icon or button, and using this icon or button, the user may check into another project.

Figure 6:
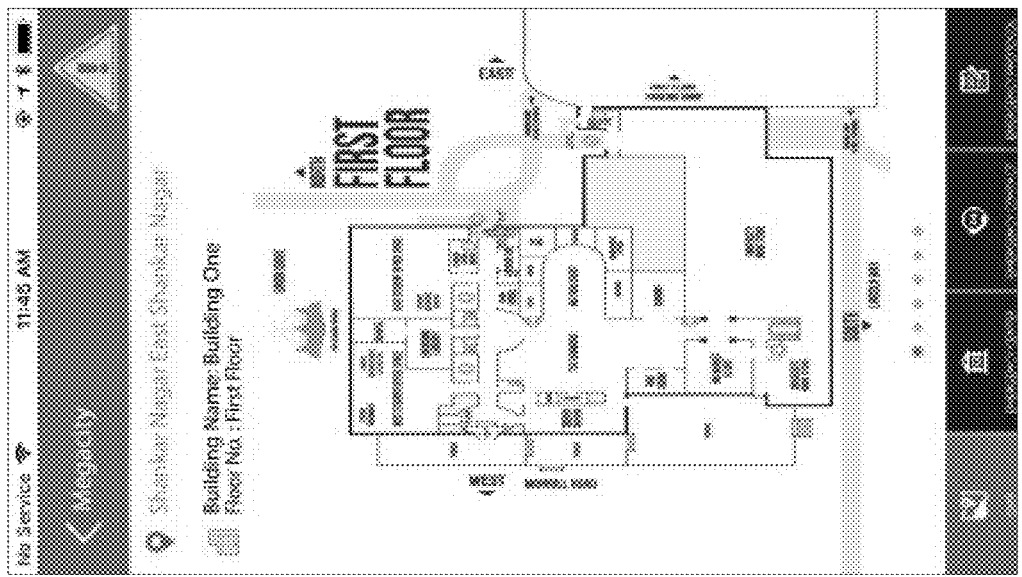
FIG. 6 depicts a project details view within an emergency responding platform in accordance with embodiments of the present disclosure.

The application also may include a project details view as depicted in FIG. 6. The project details view may include one or more tabs. For example, the view may include a tab for accessing a crisis management plan (CMP). The CMP may include a site map displaying the evacuation route and/or assembly point. If used in multi-storeyed construction, a floor-specific multiple-site map may be included in the CMP. However, it should be appreciated that additional information may be included in the CMP without departing from the present disclosure. In embodiments of the present disclosure, the floor plan may be saved offline to be accessed by the user once he/she has registered for the project to make the viewing experience run more smoothly and/or to allow access if the user is not connected to the Internet. For uploading the crisis management plan (CMP) from the web, the defined area may be available to user, and the user may have to fit the image within this frame. It should be appreciated that when a user navigates to the CMP from the project dashboard, the images may be shown from the server-end of the system and those images may be loaded by the admin assigned to the project.

The application may include video, photographs, text, audio, icons, alerts, and/or notifications alone or in combination to carry out the inventions described herein.

FIG. 6 also depicts a tab for emergency contacts that may provide one or more key officials associated with the site. This tab also may include the official's name, designation, location, and/or contact information (i.e., SMS, phone number, email address). It should be appreciated that the emergency contact may be called via API. If no emergency contact can be identified, the user may be notified by "no data found." The user may be presented with one or more options including call, message and mail, wherein the user may communicate with the emergency contact. Another tab may be provided for emergency protocols (EPs) such as evacuation routes and/or assembly areas. Again, these EPs may be called via one or more APIs.

Figure 7:
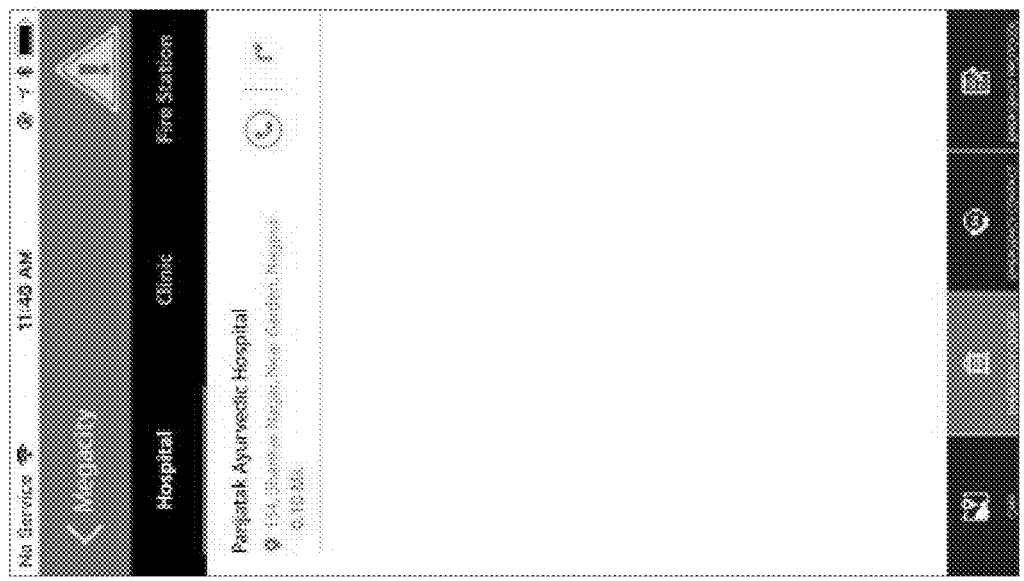
FIG. 7 depicts an emergency centers tab within an emergency responding platform in accordance with embodiments of the present disclosure.

As depicted in FIG. 7, another tab may provide emergency centers (ECs) that may be nearest in proximity to the facility/site subject to the emergency alert. The ECs may be provided in a list and/or map view and may include, but are not limited to, hospitals, clinics, fire stations, and/or police departments. In some embodiments of the present disclosure, the EC tab may include directions to the EC, distance to the EC, and/or contact information for the EC. If a user selects the EC tab, the user may be presented with all emergency centers that may be called via API. The user also may be presented with other centers that are within an area range. The user may be presented with one or more options to utilize to contact an EC, such as a call functionality where the user can communicate with the EC and a direction functionality where the user may see the exact location of the EC.

Returning to FIG. 13, in step 1303, the user may select a project and may be provided with a syncing popup to indicate when a project has been synced for offline access. After syncing, the user may be granted access to the project and may be presented with one or more tabs, such as those shown and described with respect to FIG. 6. The user also may be presented with an alert button wherein he/she may raise an alarm in an emergency situation, such as in step 1304.

Figure 3:
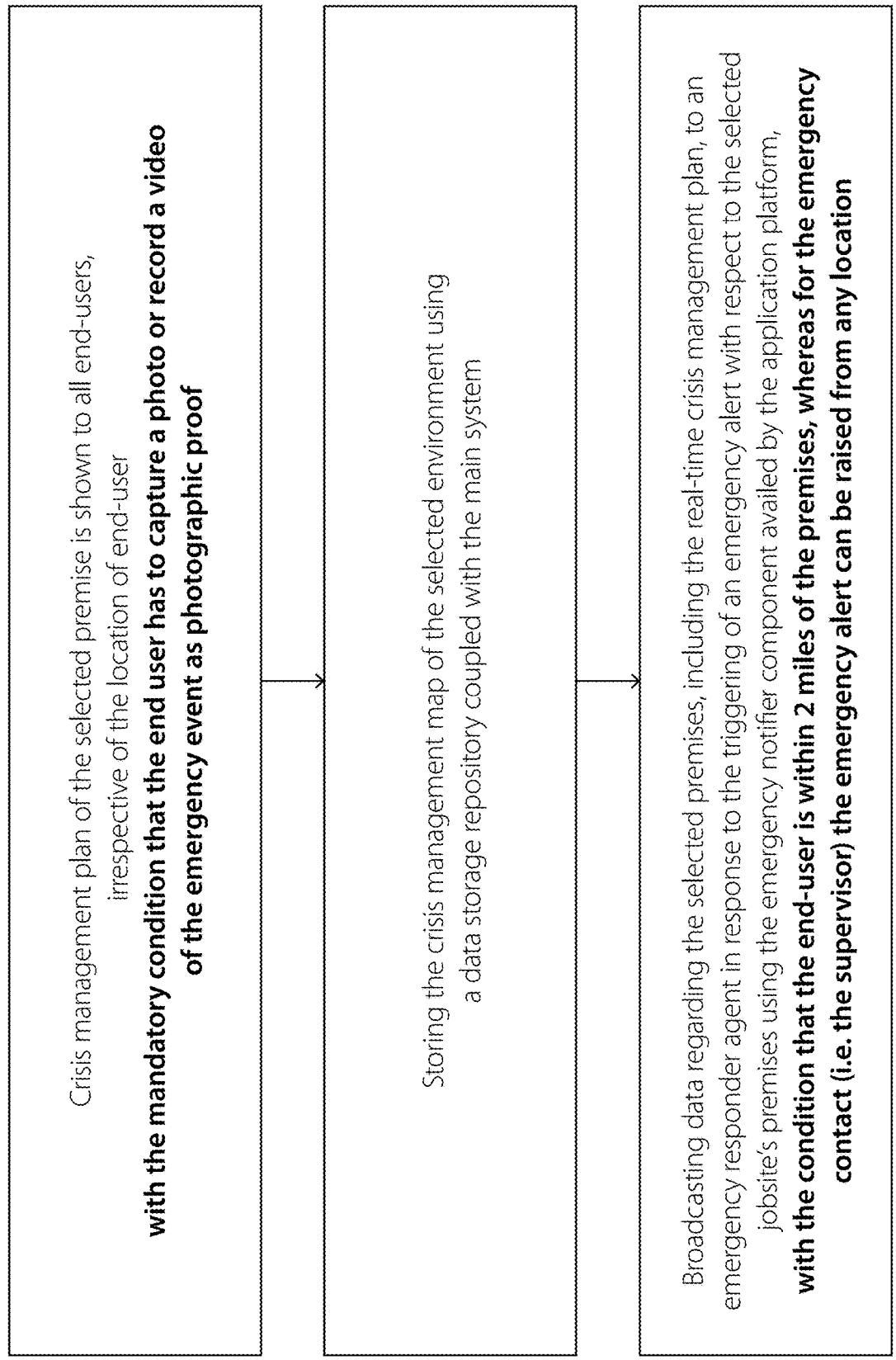
FIG. 3 is a flowchart of a method of implementing an emergency responding platform in accordance with embodiments of the present disclosure.

FIG. 3 is a flowchart of a method of implementing an emergency responding platform in accordance with embodiments of the present disclosure. This method may include showing a crisis management plan of a selected facility/site to all end users regardless the location of the end users. This may include a condition that the end users capture a photo and/or record a video of the emergency event to provide evidence of the emergency event. The crisis management map may be stored using one or more databases that may be coupled with the control system. Data may be broadcast regarding the facility/site. This data may include, but is not limited to, a real-time crisis management plan. The data may be broadcast to an emergency responder agent in response to the triggering of an emergency alert associated with the facility/site. The broadcast may occur using an emergency notifier component that may be provided through the application according to embodiments of the present disclosure. It should be appreciated that conditions may be imposed, for example, that an end user receiving the emergency alert is within a specified distance of the facility/site; however, the emergency alert may be raised from any location by a supervisor authorized to raise the alert.

FIG. 4 depicts a flowchart of communication events which may occur in accordance with embodiments of the present disclosure. When an emergency event occurs, an emergency event alert may be triggered. The alert may be sent to registered recipients, which may include all end users that are identified as part of a project at a facility/site where the alert is raised. The alert may be validated, and a supervisor may be provided with the authority to accept or reject the alert. A more detailed discussion of communication events within an emergency responding platform according to embodiments of the present disclosure is provided in FIGS. 8-11.

Figure 8:
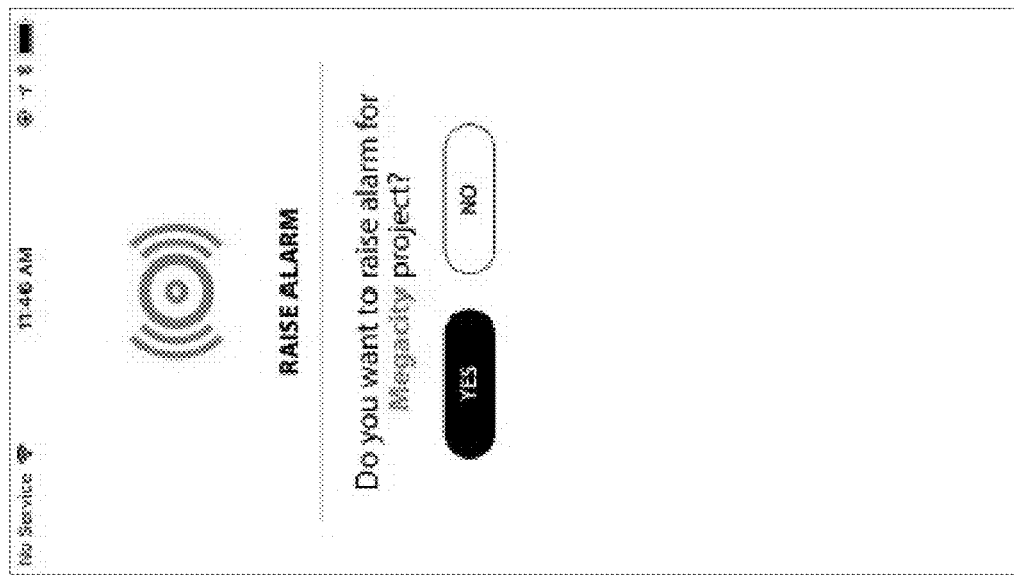
FIG. 8 depicts a screen shot to raise an alert in accordance with embodiments of the present disclosure.
Figure 9:
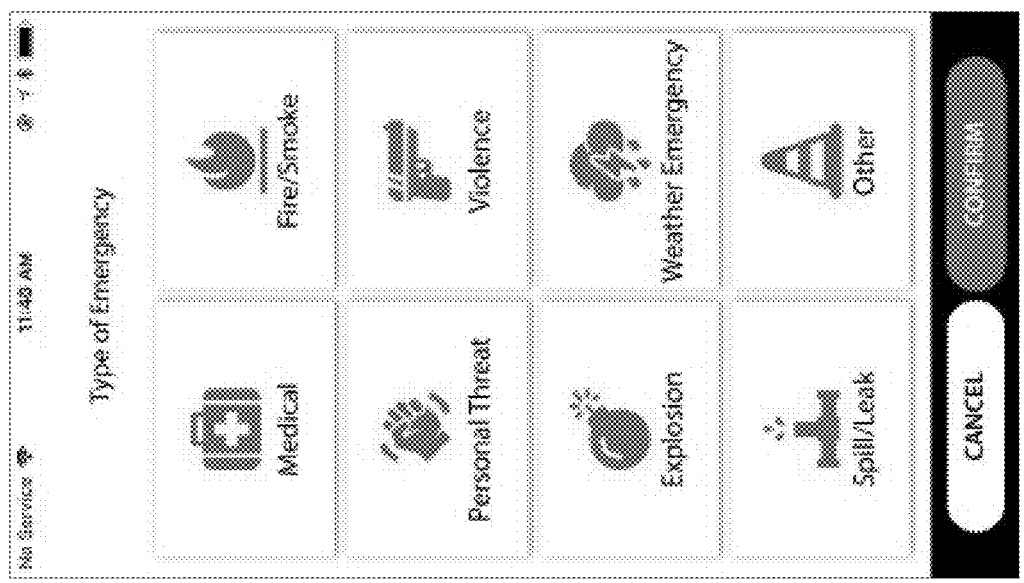
FIG. 9 depicts a screen shot to select an emergency type in accordance with embodiments of the present disclosure.

End users may be permitted to raise an alert in embodiments of the present disclosure. As depicted in FIG. 8, once an end user is checked in and confirmed to be within a specified vicinity, the application may display a question, such as "Do you want to raise an alarm?" and including icons or buttons designating "yes" or "no" from which the user may select. While certain questions and icons or buttons are depicted in embodiments of the present disclosure, it should be appreciated that modifications to the questions/prompts and the means for selection may be made without departing from the present disclosure. If the end user selects "yes," the user may then be prompted to choose a type of emergency as depicted in FIG. 9. Types of emergencies may include, but are not limited to, medical, fire/smoke, personal threat, violence, explosion, weather emergency, spill/leak and/or other. Once the end user has selected a type of emergency, he/she may then select the "confirm" icon or button, and upon doing so, a notification may be sent to the supervisor for alert confirmation. In some embodiments of the present disclosure, the end user may receive a message or some other notification that the alert has been raised to a supervisor successfully.

It should be appreciated that an end user may be prompted or redirected to the camera window in his/her handheld device. The end user may then be asked to capture a site photo/record video for documentary proof of the emergency event. The application may permit the end user to save the photo/video and send them to the listed emergency contacts in real time. This documentary proof also may be saved in one or more databases associated with the application and relevant details (i.e., end user's mobile number, time/date of alert received) also may be saved. This log may be maintained by the client admin as discussed herein. A warning message may be displayed (and optionally along with a sound and/or vibration notification) once an alert is verified and raised by an emergency supervisor. On receipt of an alert, all end users are enabled to see the photo/video that was provided to the emergency supervisor.

Returning to FIG. 13, if the user elects to a raise an alert, the user may be navigated to a type of emergency screen where the user may select one of a plurality of predefined emergency options. If the user's emergency falls outside of those options, the user may select "other" and provide information about the emergency type. When the user raises an alert in step 1304, a popup message may be displayed to the user indicating that the alert has been raised successfully. At this stage, the alert may be sent to an emergency contact (i.e., responder and/or supervisor).

Figure 10:
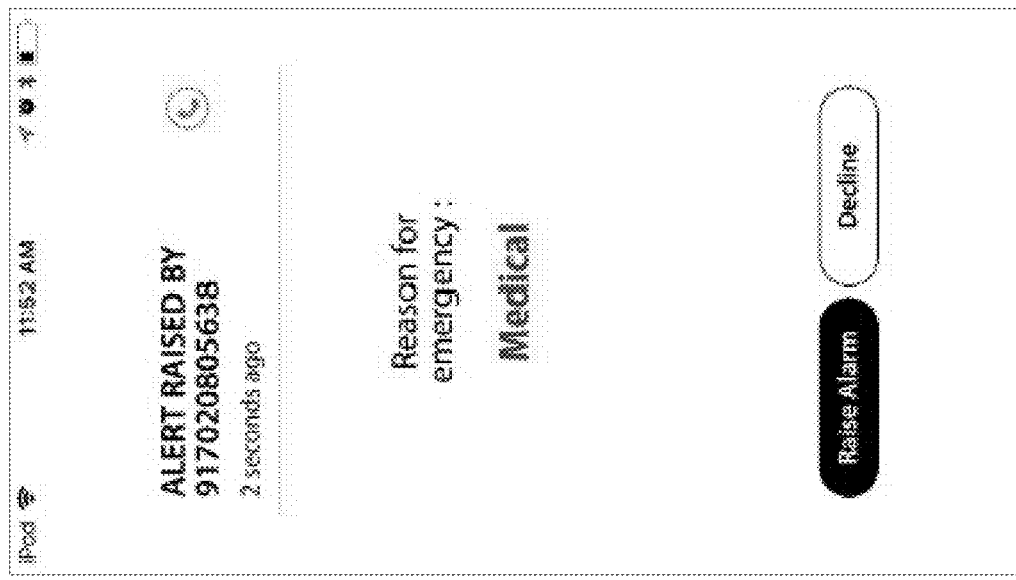
FIG. 10 depicts a screen shot of a warning or alert displayed to a supervisor in accordance with embodiments of the present disclosure.

As depicted in FIG. 10, a warning or alert message may be displayed to the supervisor once an alert has been raised by an end user. In some embodiments of the present disclosure, sound and/or vibration may accompany the warning or alert message. In one embodiment, the application may allow a user to program a global alarm based upon having certain administrative rights, a specific administrative role, or otherwise that is provided wirelessly to sound emitting devices. The warning or alert message may include, but is not limited to, location where the alert originated, how long ago the alert was sent, and/or the emergency type. The supervisor may elect to accept or reject the alert (FIG. 13, step 1305). If the supervisor elects to accept (raise) the alert, then a notification may be sent to all checked-in end users who are present in the vicinity of the facility/site that is affected (FIG. 13, step 1306). The supervisor then may be provided with a message or some other notification that the alert has been raised successfully. If the supervisor declines to raise the alert, the supervisor may be prompted to provide a reason for declining including, but not limited to, this problem is already solved, an alarm has already been raised, the alert is spam, and/or other. If an alert raised turns out to be spam, the alert may be declined instantly in embodiments of the present disclosure. There also may be embodiments of the present disclosure where the end user that provides the alert determined to be spam may be deactivated or barred from using all or a portion of the application features. This adjustment typically may be made by a client admin. The supervisor could decline an alert if the emergency event is not serious enough to vacate the facility/site immediately (i.e., the event may be addressed easily). Further, if multiple end users send multiple alerts for the same emergency, only one alert should be accepted and the rest may be declined by providing those end users with a comment that the alert has already been raised. It should be appreciated that there may be other grounds for declining an alert, and the supervisor may do so by registering his/her remarks on the alert. Those comments may be saved for further assessment as well as data-keeping within the application.

Figure 11:
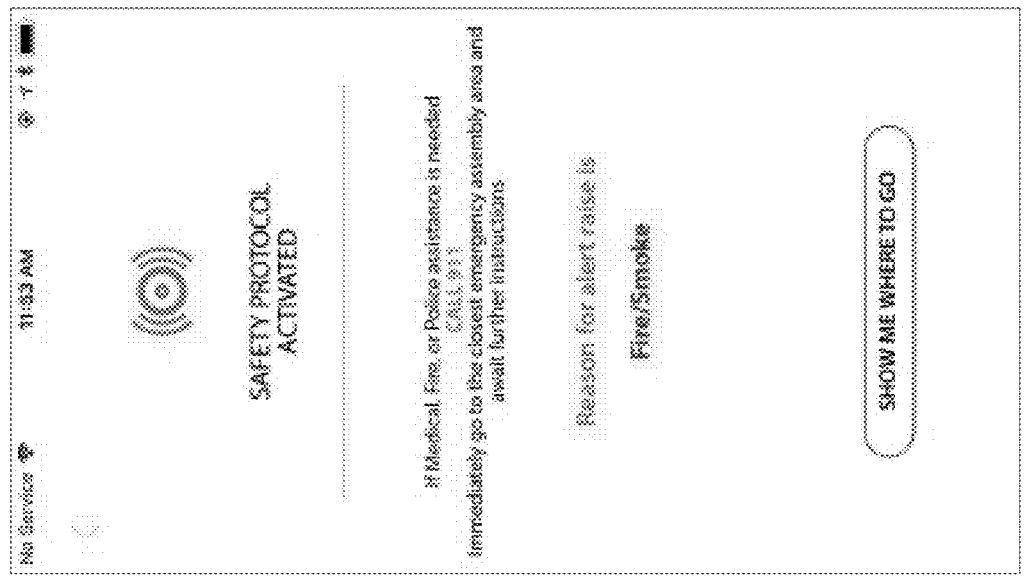
FIG. 11 depicts a screen shot of an alert displayed to an end user in accordance with embodiments of the present disclosure.

On receipt of an alarm, all end users may also be able to see the type of emergency that was shared with emergency contacts. FIG. 11 depicts a screen shot that may be provided to an end user receiving the alarm in embodiments of the present disclosure. This screen may include a "show me where to go" button, touchscreen selection, or icon. If the user selects this icon or button, the user may be redirected to the emergency protocol tab. It should be appreciated that there may be embodiments of the present disclosure where latitude/longitude may be saved for end users to update their specific locations. It also should be appreciated that the alarm should be raised to end users who are in the vicinity of the facility/site in question and are checked-in. The alarm may be in an activated mode until the emergency contact person or supervisor deactivates the alarm. In the activated mode, end users may be able to see the project with an identifier for emergency in the project list. An end user may view the details of the emergency by selecting the identifier. Once the emergency contact or supervisor deactivates the alarm (FIG. 13, step 1307), the end user may receive a pop-up notification. The emergency contact or supervisor may be prompted to provide comments as to why the alarm is being deactivated. The list view of the project may be normalized thereafter.

While embodiments of the present disclosure may be used on construction job sites, it should be appreciated that applications may be used to provide first-hand safety access and/or emergency alerts for facilities/sites in other business situations without departing from the present disclosure. In addition, the present disclosure covers event planning, office management, outside events, parks, oil and gas operations, and healthcare applications. Further, while embodiments of the present disclosure are described with respect to users utilizing portable handheld devices that are enabled for wireless communication, it should be appreciated that other types of devices, such as desktop computers, may be utilized without departing from the present disclosure. Further, while the application according to embodiments of the present disclosure may be installed on a portable handheld device, there may be other embodiments of the present disclosure where users may access the application through other means, such as through an Internet browser. Regardless what method a user utilizes to access the application, the user may be provided with defined functions to exchange information about an emergency situation within the vicinity of a facility/site to a pre-defined list of emergency contacts. In addition, while numerous features and screens have been described with respect to the application, it should be appreciated that the application, at minimum, may include a button or icon that enables users to prompt actions/response to an emergency situation.

It should be appreciated that information regarding evacuation of users from facilities/sites and the surrounding area(s) may be broadcast to selected users based on their status of having checked into a facility/site through the application. While check-in may occur through use of a quick response (QR) code or PIN as described herein, it should be appreciated that other means of check-in may be utilized without departing from the present disclosure. Further, when crisis management plans (CMPs) are referenced herein, the egress points and escape routes within the CMPs may be determined for each specific level or area of a facility/site in embodiments of the present disclosure. However, other methods of determining or setting egress points and escape routes may be utilized without departing from the present disclosure. Further, evacuation plans may be determined for users within a facility/site through use of one or more dedicated emergency protocols in embodiment of the present disclosure, thereby enabling prompt evacuation when an emergency event occurs. Having dedicated emergency protocols in place may reduce the response time in an emergency situation, thus mitigating injuries or other casualties, for example. When the application is described as maintaining location data, it should be appreciated that this may mean saving latitude/longitude positions for users and then allowing users to update these positions when an alert is raised; however, other methods for maintaining and updating location data may be utilized without departing from the present disclosure.

Administrative functionalities for the application may be web-based in embodiments of the present disclosure. It should be appreciated that one or more administrative levels may be provided within the application in embodiments of the present disclosure. For example, there may be one or more super admin users from a product owner team, and there may be one or more client admins from the platform user side. However, there may be other embodiments where only one type of admin may be provided.

Super admins may have access to an exclusive dashboard view of the application interface that may provide a list of clients and/or a list of client sites. Super admins may be provided with details to enable client account management. Various usage packages may be made available to users, and these packages may include certain features, including, but not limited to, an identification of accessible facilities, the number of users allowed, and package expiration information. Super admins may be able to review usage pattern information, including the expiration and the allowable number of users in a package. Super admins also may maintain logs of deployed solutions on the compatible server infrastructure identified and directed by a client.

Client admins may be provided with various user-management functionalities that may be facility/site-specific, including the ability to add, edit and/or delete sites, change names/locations of sites, add site emergency contacts, edit or deactivate the site admin, and share account credentials with a user. Client admins also may have site data management functionalities including the ability to define location names/floors, manage a site location using latitude/longitude, view logs for logged-in users on site, and view images and/or videos uploaded by end users in an emergency situation.

Client admins may manage users and site data including editing/deactivating site admins. Client admins also may maintain site-relevant data including, location names/floors, CMPs, emergency centers (addition/editing/deletion), emergency contacts (addition/editing/deletion), designation of emergency protocols, site location management using latitude/longitude, logs associated with logged-in users on site, and viewing of images and/or videos that are uploaded. Client admins may pre-define the first responder lists for the sites/facilities where they are responsible. This list may include, but is not limited to, the names, contact numbers, and job designation details of the first responders. Client admins may manually input information on emergency centers based on their proximity to the facility/site in question; however, there may be embodiments of the present disclosure where automated information may be provided, such as through the Google location APIs. Client admins also may share account login credentials with end users.

Web admins will be able to see history logs for mobile users. Last logged-in status may be shown for all mobile users. New additions in users also may be shown. Web admin will be provided with Google Translate or equivalent interface to manage contents in different languages as application is multilingual. Though the input titles and other instructions on the application may be multilingual, there may be embodiments of the present disclosure where the input fields may be restricted to a single language.

In another embodiment, the application is configure to interface with an annunciator, building alarm, IP camera, speaker, microphone, or any other alarm that is part of a building, walls, plant, or structure (which may be referred to herein as "annunciator devices"). Annunciator devices are configured to be integrated with a location, business, or building. Annunciator devices may comprise a strobe light, microphone, speaker, alarm, may be operable to make an alarm sound, may be operable to receive a message and/or signal related to an alarm event, may be operable to receive a pre-defined or real time message, may play a pre-defined or real time message, may be operable to receive an encrypted message and/or alarm, and may include or exclude any of these examples alone or in combination. The application may be operable to interface with one or more annunciator devices through direct communication or indirect communication, through wireless or wired communication, through various networks such as the Internet, Wi-Fi, LTE, ZigBee, Z-wave, mesh networks, one or more servers, cloud architectures, through a security system, or any combination of these networks. In such a configuration, an alarm from the application may be sent to a system that is operable to control one or more annunciator devices in a given space. Upon validation of the alarm, the system may then be configured to send an alarm and/or message to one or more annunciator devices, wherein the annunciator devices may be operable to play a message over a speaker wherein the message may be a predefined message, custom message, saved message, or live message. In this embodiment, having the annunciator devices play voice messages may provide additional awareness of a given emergency situation in the building, plant, or other venue. Rather than a flashing light and/or loud alarm, the patrons or employees receives a message or alert that directly indicates what kind of emergency is occurring, and perhaps even on which floor the emergency is related to for situational awareness purposes. The message provided through the annunciator devices can be a fire alarm, active shooter alarm, flood alarm, security alarm, employee alarm, healthcare alarm, building alarm or any of these alarms alone or in combination. The application may be operable to present a graphical user interface wherein the user can press an alert icon, wherein upon pressing the icon, an alarm may be sent to the devices registered or associated with the system. Upon receipt of the alarm, one or more client administrators may determine to confirm or decline the alarm condition. Upon confirmation of the alarm, the alarm message or signal may be sent to either the building system that has control and may communication with one or more annunciator devices or directly to the annunciator devices. The client administrators may create and/or send a message that is to be played on one or more of the annunciator devices and the message comprises voice, text, or an alarm sound. In one embodiment, the system communicating with the annunciator devices may receive the message and approve the message for it to be played on the one or more annunciator devices, which would provide a two-factor authentication before the message is played. In another embodiment, the same or similar message may also be received by devices subscribed or registered with the application. If devices are in silent mode or vibrate mode, the system may be configured to override this setting on the phone such that the message with video, text, alarm, or voice may be played, received, or an audible sound to alert may be played so the user of an emergency condition or situation will hear or otherwise be alerted to the emergency. The annunciator devices may be grouped by floor, building, set of buildings, location, grouping of offices, or one office wherein the annunciator devices can play the message on one or more annunciator devices in the pre-defined or custom-based devices can play the same or different message. For example, a certain floor of the building may play a message that is voice-based and on a different floor or in the lobby for example, an annunciator device may sound an alarm or flashing light.

On the application, one or more client admins may create a custom voice, text, or define a certain alarm condition to be played on one or more annunciator devices. On the application, the message may be sent by pressing of an icon or one or more icons that represent various alarms. The client admins or emergency supervisor may also create a custom voice or text message on the application. The client admins on the application can also communicate directly with the annunciator devices using the application. The application also may be operable to communicate with the building system or system that is in communication with the annunciator devices wherein the system that is in communication with the annunciator devices may be operable to register or authenticate the user of the application. In another embodiment, the system that is in communication with the annunciator devices may pre-register certain client admins or authenticate certain events that can be triggered by the application once a client admin has chosen to elevate the alarm condition (through selection of an icon, voice control, touchscreen selection, clicking or other selection) on the application.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. An emergency reporting system comprising:
a control system configured to communicate with one or more handheld mobile devices over a wireless communication interface to provide real-time updating and assessment of an emergency event occurring at a specified facility or site, the control system comprising an emergency responder reporting component, a map updater, a device position determiner, an emergency trigger, and a real-time update generator; and
a memory device comprising at least one database coupled to the control system, wherein the at least one database stores real-time maps and locations of the specified facility or site, evacuation plans and maps of the specified facility or site, and crisis management plans for retrieval by the control system upon occurrence of the emergency event,
wherein users associated with the one or more handheld mobile devices check into the emergency reporting system, and upon checking into the emergency reporting system and being confirmed to be associated with the specified facility or site, the users report the emergency event, and users logged into the emergency system and confirmed to be associated with the specified facility or site receive an alert about the emergency event through the emergency reporting system,
wherein a crisis management plan associated with the specified facility or site is displayed from a server-end of the system upon activation of the alert about the emergency event, the crisis management plan including a map of the selected facility or site displaying an evacuation route and/or assembly route,
wherein the control system provides real-time updates to the users for the specified facility or site while the alert is activated, and
wherein the users check into the emergency reporting system using a unique quick response (QR) code or personal identification number (PIN) and the users associated with the specified facility or site must be checked into the control system to transmit the alert.

2. The emergency reporting system of claim 1, wherein the specified facility or site includes the facility or site and area within a predefined vicinity of the facility or site.

3. The emergency reporting system of claim 1 further comprising:
a location determining agent associated with the specified facility or site that discloses the locations of the one or more handheld mobile devices of the users to the one or more emergency responders in real-time after the alert is activated.

4. The emergency reporting system of claim 1, wherein the control system activates a sound alert at the specified facility or site when the alert is activated.

5. An emergency reporting system comprising:
a control system configured to communicate with one or more handheld mobile devices over a wireless communication interface to provide real-time updating and assessment of an emergency event occurring at a specified facility or site, the control system comprising an emergency responder reporting component, a map updater, a device position determiner, an emergency trigger, and a real-time update generator; and
a memory device comprising at least one database coupled to the control system, wherein the at least one database stores real-time maps and locations of the specified facility or site, evacuation plans and maps of the specified facility or site, and crisis management plans for retrieval by the control system upon occurrence of the emergency event,
wherein users associated with the one or more handheld mobile devices check into the emergency reporting system, and upon checking into the emergency reporting system and being confirmed to be associated with the specified facility or site, the users report the emergency event, and users logged into the emergency system and confirmed to be associated with the specified facility or site receive an alert about the emergency event through the emergency reporting system,
wherein a crisis management plan associated with the specified facility or site is displayed from a server-end of the system upon activation of the alert about the emergency event, the crisis management plan including a map of the selected facility or site displaying an evacuation route and/or assembly route,
wherein the control system provides real-time updates to the users for the specified facility or site while the alert is activated, and
wherein when the users report the emergency event, the users provide documentary proof of the emergency event.

* * * * *